(12) United States Patent
Hartmann et al.

(10) Patent No.: US 8,423,251 B2
(45) Date of Patent: Apr. 16, 2013

(54) METHOD AND DEVICE FOR OPERATING A DRIVE UNIT

(75) Inventors: Dirk Hartmann, Stuttgart (DE); Georg Mallebrein, Korntal-Muenchingen (DE); Werner Mezger, Eberstadt (DE); Andreas Roth, Muehlacker-Lomersheim (DE); Henri Barbier, Schwieberdingen (DE); Nikolas Poertner, Stuttgart (DE); Frank Schiller, Tamm (DE); Juergen Rappold, Ilsfeld-Auenstein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 744 days.

(21) Appl. No.: 11/991,708

(22) PCT Filed: Aug. 1, 2006

(86) PCT No.: PCT/EP2006/064906
§ 371 (c)(1),
(2), (4) Date: Sep. 28, 2009

(87) PCT Pub. No.: WO2007/028682
PCT Pub. Date: Mar. 15, 2007

(65) Prior Publication Data
US 2010/0017079 A1    Jan. 21, 2010

(30) Foreign Application Priority Data
Sep. 9, 2005   (DE) .......................... 10 2005 042 845

(51) Int. Cl.
*G06F 7/00*      (2006.01)
*G06F 17/00*     (2006.01)
*G06F 19/00*     (2006.01)

(52) U.S. Cl.
USPC ................... 701/54; 701/51; 701/99; 477/34; 477/43

(58) Field of Classification Search ................ 701/1, 36, 701/51, 53–56, 99, 101–106, 110, 112; 477/34, 477/43, 68, 107, 110; 123/56.5, 56.8, 691, 123/692
See application file for complete search history.

(56) References Cited

U.S. PATENT DOCUMENTS 5,038,635 A    8/1991  Takizawa
5,540,633 A *  7/1996  Yamanaka et al. ............ 477/107
(Continued)

FOREIGN PATENT DOCUMENTS

DE    3827152     2/1989
DE    10303461    9/2003
(Continued)

OTHER PUBLICATIONS

International Search Report, PCT International Patent Application No. PCT/EP2006/064906, dated Nov. 28, 2006.

*Primary Examiner* — Thomas Tarcza
*Assistant Examiner* — Rami Khatib
(74) *Attorney, Agent, or Firm* — Kenyon & Kenyon LLP

(57) ABSTRACT

A method and a device are provided for operating a drive unit having an engine and a transmission, which make possible an improved shifting strategy. In a first operating state, the engine is operated using a first number of active cylinders. In a second operating state, the engine is operated using a second number of active cylinders. The first number is different from the second number. A gear ratio is set as a function of at least one operating variable of the drive unit. The gear ratio is also set as a function of the current or the attainable operating state of the engine with respect to the number of the active cylinders.

25 Claims, 3 Drawing Sheets

U.S. PATENT DOCUMENTS

| | | |
|---|---|---|
| 6,199,005 B1 | 3/2001 | Iwata |
| 6,892,126 B2 | 5/2005 | Tashiro et al. |
| 7,044,107 B1 * | 5/2006 | Duty et al. .................. 123/362 |
| 7,179,199 B2 * | 2/2007 | Kushiyama et al. .......... 477/181 |
| 2003/0144784 A1 * | 7/2003 | Tashiro et al. ................. 701/54 |

FOREIGN PATENT DOCUMENTS

| | | |
|---|---|---|
| EP | 0875414 | 11/1998 |
| JP | 2003-220857 | 8/2003 |

* cited by examiner

METHOD AND DEVICE FOR OPERATING A DRIVE UNIT

FIELD OF THE INVENTION

The present invention relates to a method and a device for operating a drive unit.

BACKGROUND INFORMATION

Conventional drive units, for instance, in motor vehicles, include an engine and a gear box, in a first operating state, the engine being operated using a first number of active cylinders and in a second operating state, the engine being operated using a second number of active cylinders, the first number being different from the second number. In so-called half engine operation, one-half of the cylinders are shut down by shutting down the intake and exhaust valves as well as the injection, which makes possible a saving of fuel as compared to normal full engine operation, in which all the cylinders are activated, and consequently none of the cylinders is shut down. Furthermore, in the case of a vehicle, the same expected torque is able to be set using various pairings of engine speed and engine torque, by using different gear speeds and gear ratios. It is generally more favorable for fuel usage to present a desired wheel torque using a gear that is as high as possible and a gear ratio that is as large as possible, that is, low engine speed and large engine torque, since the engine is then able to be operated in a more dethrottled manner, and the engine efficiency is higher. In vehicles having an automatic transmission, the gear selection and the selection of gear ratio are assumed by a transmission control unit.

SUMMARY

An example method according to the present invention and an example device according to the present invention, for operating a drive unit may have the advantage that the gear ratio is also set as a function of the current or achievable operating state of the engine, with regard to the number of the active cylinders. By taking into account the current or the achievable operating state of the engine with respect to the number of the active cylinders in the selection of the gear ratio, one is able to achieve an even lesser fuel usage or an even higher efficiency of the drive unit.

It may be particularly advantageous if the gear ratio is set according to an optimization criterion, so that, at the same value for an output variable of the drive unit with respect to the optimization criterion, optimum values come about for the at least one operating variable of the drive unit and the operating state of the engine with regard to the number of the active cylinders. In this way, in order to put into use a desired value for the output variable, a gear ratio may be set in the case of which the optimization criterion is able to be satisfied even better, based on the consideration of the operating state of the engine with regard to the number of the active cylinders, than solely in response to the consideration of the at least one operating variable of the drive unit.

In an advantageous manner, the criteria that are suitable as optimization criteria may be the operation of the engine in the first operating state or the operation of the engine in the second operating state and/or an operation of the drive unit at minimal fuel usage and/or an operation of the drive unit at maximum efficiency.

If the operation of the engine in the first operating state is selected as the optimization criterion, and the operating state of the engine is also set as a function of the at least one operating variable, the example method according to the present invention may be implemented particularly simply and reliably by checking whether a gear ratio is able to be set in which, at the same value for the output variable of the drive unit the at least one operating variable assumes a value at which the engine is operated in the first operating state and, in response to a positive checking result, such a gear ratio is set, and in response to a negative checking result, the gear ratio is set independently of the operating state of the engine with respect to the number of the active cylinders.

If the operation of the engine in the first operating state is selected as the optimization criterion, then in the case of several possible gear ratios for the first operating state of the engine, an additional optimization may be implemented if the gear ratio that is to be set is selected from the possible gear ratios according to a further optimization criterion. In this manner, a multiple optimization according to various optimization criteria is possible for the selection of the gear ratio that is to be set.

In an especially simple manner, the gear ratio may be set as a function of two operating variables, preferably of an engine speed or an output speed and an engine torque.

According to one advantageous specific embodiment of the present invention, the operating boundaries between the two operating states of the engine and/or the current value of the at least one operating variable of the drive unit may be transferred by an engine control unit to a drive control unit, the transmission control unit setting the gear ratio. This represents an especially simple and modularly constructible implementation, which may be integrated into existing design approaches without effort worth mentioning.

This also has the advantage that the operating boundaries between the two operating states of the engine are determined as a function of additional operating variables, particularly the oil pressure and the environmental pressure. This may be accomplished by the engine control without any substantial additional effort, so that the drive control is always informed of the current operating boundaries between the two operating states of the engine with regard to further operating variables.

An additional simplification comes about if the operating boundaries between the two operating states of the engine are stored in the transmission control as fixed values. In this case, the transfer of the operating boundaries from the engine control unit to the transmission control unit is not required.

BRIEF DESCRIPTION OF THE DRAWINGS

An exemplary embodiment of the present invention is shown in the figures explained in greater detail below.

DETAILED DESCRIPTION OF EXAMPLE EMBODIMENTS

The subject matter of the present invention is a method and a device for operating a drive unit of a vehicle, for instance. The drive unit includes an engine and a transmission. The engine is developed as an internal combustion engine, for example. This may involve, for example, an Otto engine or a Diesel engine. In a first operating state, the engine is operated using a first number of active cylinders. In a second operating state, the engine is operated using a second number of active cylinders. The first number is different from the second number. It will be assumed below, for example, that the first operating state is the so-called half engine operation, in which one-half of the cylinders of the engine is shut down by shutting down the intake and exhaust valves, as well as the injection. In this context, a bank cutoff or a cylinder cutoff may be involved. In the case of the bank cutoff, the engine includes an even number of cylinder banks, each cylinder bank including the same number of cylinders. Bank cutoff in half engine means that one-half of the cylinder banks are cut off completely, that is, including all the cylinders located on them, in the manner described, by cutting off the intake and exhaust valves and the injection. In the cylinder cutoff, one-half of the cylinders is cut off in the manner described, independently of on which cylinder bank they are located and independently of whether a plurality of cylinder banks is provided at all. For a running of the engine that is as quiet as possible in half engine operation, it is recommended that one cut off every other cylinder in the ignition sequence.

Figure 1:
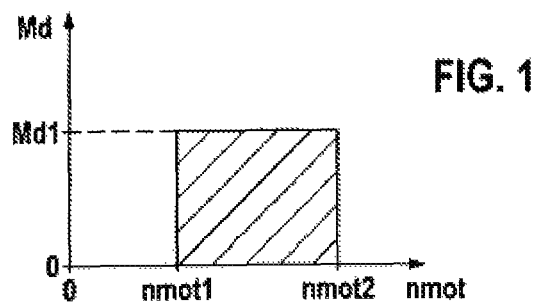
FIG. 1 shows a diagram of the engine torque plotted against the engine speed, to illustrate the operating boundaries between two operating states of the engine with respect to the number of the active cylinders.

The second operating state of the engine is then the full engine operation, in this example, in which no cylinder is cut off The half engine operation makes fuel savings possible in comparison with full engine operation. Half engine operation is possible only in a limited operating range. This is depicted in FIG. 1. FIG. 1 shows a diagram of the torque delivered by the engine, designated below also as engine torque Md, plotted against the engine speed nmot. Half engine operation is only possible for engine speeds above a first engine speed threshold nmot1 and below a second engine speed threshold nmot2, that is, for nmot1<nmot<nmot2. Half engine operation is also only possible for engine torques Md below a prespecified engine torque value Md1. Consequently, half engine operation is only possible in the range shown hatched in FIG. 1 for engine torque Md and engine speed nmot.

When first speed threshold nmot1 is exceeded and second speed threshold nmot2 is undershot by engine speed nmot, a switchover takes place from full engine operation to half engine operation, possibly taking hysteresis into consideration, on the assumption that engine torque Md lies below engine torque value Md1. When prespecified engine torque value Md1 is undershot, a switchover also takes place from full engine operation to half engine operation, also again taking into consideration hysteresis, assuming that engine speed nmot lies between first engine speed threshold nmot 1 and second engine speed threshold nmot 2. Conversely, for Md<Md1, a switchover takes place from half engine operation, possibly while taking into consideration hysteresis, when the first engine speed threshold is undershot and when the second engine speed threshold nmot2 is exceeded and the prespecified engine torque value Md1 is exceeded for nmot1<nmot<nmot2.

For different gear speeds and gear ratios, the same wheel torque may be set as the output variable of the drive unit of the vehicle, having various value pairs of engine speed nmot and engine torque Md. It is generally more favorable for fuel usage to present a desired wheel torque using a gear that is as high as possible and a gear ratio that is as large as possible, and with that an engine speed that is as small as possible, and large engine torque, since the engine is then able to be operated in a more dethrottled manner and having a higher efficiency.

The desired wheel torque may be ascertained in a conventional manner, for instance, as a function the accelerator position or of the torque request of a wheel slip traction control system or an antilock brake system or an electronic stability program or a vehicle speed control system.

In the case of vehicles having an automatic transmission, the gear selection or the selection of the gear ratio is assumed by a transmission control unit which, for instance, selects that value pair of engine speed nmot or output speed and engine torque Md from the value pairs that are possible for the implementation of the desired wheel torque, from the engine speed and the engine torque, at which the fuel usage is the lowest. This takes place in a conventional manner, in the transmission control unit, up until now, no taking into consideration of the operating state of the engine with respect to the number of the active cylinders being known for the selection of the gear ratio or the selection of the gear.

Figure 2:
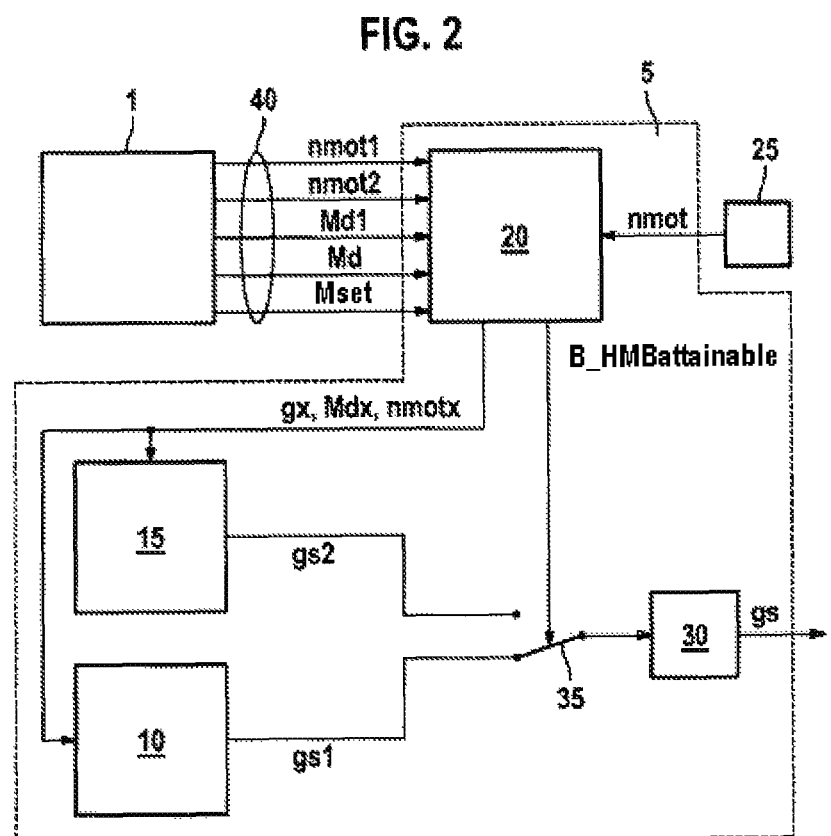
FIG. 2 shows a block diagram for an exemplary construction of a device according to the present invention.

It is therefore provided, according to the present invention, to take into consideration the operating state of the engine with regard to the number of the active cylinders in selecting the gear or in selecting the gear ratio, for example, so as to reduce the fuel consumption even further. This is clarified in more detail in the following with reference to the block diagram in FIG. 2. In FIG. 2, 1 denotes an engine control unit and 5 a transmission control unit of the drive unit. In engine control unit 1, engine speed thresholds nmot1, nmot 2 and prespecified engine torque value Md1 are stored. The respective values may be stored, for instance, as fixed values in a memory of engine control unit 1 or in a memory assigned to engine control unit 1. They may also be determined, however, by engine control unit 1 as a function of additional operating variables of the drive unit such as the engine oil pressure and the environmental pressure, for instance, with the aid of a characteristics map applied on a test stand. The environmental pressure, in this context, depends on the height above sea level. Over a data bus 40, for instance, the engine control unit transmits engine speed thresholds nmot1, nmot2 as fixed values or as currently ascertained as a function of additional operating variables, and prespecified engine torque value Md1, stored as a fixed value currently ascertained, to transmission control unit 5 and, in that area, to a gear ascertainment unit 20. Furthermore, engine control unit 1 ascertains the current engine torque Md of the engine, for instance, by measurement or modeling in a conventional manner, and supplies it via data bus 40 to gear ascertainment unit 20. An engine speed sensor 25 passes on the current value for engine speed nmot to transmission control unit 5, and in it to gear ascertainment unit 20. In this instance, the current value of engine speed nmot may also be transmitted by speed sensor 25 to engine control unit 1 and from there, via data bus 40, to gear ascertainment unit 20. In addition or alternatively to the transmission of the current value for engine torque Md and/or of the current value nmot for the engine speed, engine control unit 1 is also able to transmit a setpoint value for wheel torque Mset via data bus 40 to gear ascertainment unit 20, setpoint value Mset being ascertained in engine control unit 1, in a conventional manner, as a function of the activation of the accelerator and/or of a torque request of a wheel slip traction control system, an antilock brake system, an electronic stability program, a vehicle speed control system and/or the like. First engine speed threshold nmot1 and/or second engine speed threshold nmot2 and/or prespecified engine torque value Md1 may also be stored as fixed values in a memory of gear ascertainment unit 20 or in a memory of transmission control unit 5 that is assigned to gear ascertainment unit 20. The fixed values may also be applied on a test stand, in this instance, in a conventional manner. It may, for instance, be provided in this context that, if gear ascertainment unit 20 receives the first engine speed threshold nmot1 and/or second engine speed threshold nmot2 and/or prespecified engine torque value Md1 via data bus 40 from engine control unit 1, then instead of the appropriate fixed value stored in gear ascertainment unit 20 or stored in an assigned manner to gear ascertainment unit 20, the value received over data bus 40 is used as a corresponding range limit for half engine operation for the subsequent processing.

This is so, above all, if corresponding range limits nmot1, nmot2, Md1 are currently determined in engine control unit 1 as a function of additional operating variables, such as oil pressure and environmental pressure.

It is the function of gear ascertainment unit 20 to ascertain various possible gear ratios gx as a function of the current value Md for the engine torque and of the current value nmot for the engine speed, or alternatively as a function of setpoint value Mset for the wheel torque. In this context, it will be assumed in the following (case 1) that these gear ratios gx are ascertained based on the current value Md for the engine torque and on the current value nmot for the engine speed. In the process, the current value for the wheel torque is determined as the output variable of the drive unit from the current value Md for the engine torque and the current nmot for the engine speed, while taking into consideration the current gear known in gear ascertainment unit 20 and the current gear ratio known in gear ascertainment unit 20 in a conventional manner. Subsequently, gear ascertainment unit 20 ascertains various, however, preferably not necessarily all gear ratios and value pairs assigned respectively to these gear ratios for engine torque Md and engine speed nmot, for which the ascertained current wheel torque comes about as the output variable of the drive unit. Gear ratios gx ascertained in this manner are supplied to a first ascertainment unit 10 and a second ascertainment unit 15 of transmission control unit 5, together with the respectively assigned value pairs for the engine torque and the engine speed, which are designated as Mdx and nmotx in FIG. 2. First ascertainment unit 10 ascertains a first setpoint value gs1 for a gear ratio that is to be set, from supplied gear ratios gx, according to a first optimization criterion. Second ascertainment unit 15 ascertains a second setpoint value gs2 for the gear ratio, from supplied gear ratios gx, according to a second optimization criterion. Either the output of first ascertainment unit 10, and thus first setpoint value gs1, or the output of second ascertainment unit 15, and thus second setpoint value gs2 is passed on to an optionally provided debouncing unit 30, which makes possible a hysteresis of the switching process of switch 35, and is developed, for instance, as delay element having a fixed specified time constant as the delay time. Consequently, too frequent gear changes are able to be avoided by the debouncing using debouncing unit 30. A resulting setpoint value gs is then present, at the output of debouncing unit 30, for the gear ratio that is to be set, which is passed on by transmission control unit 5 to the transmission, and is implemented at the transmission. Depending on the switch position, resulting setpoint value gs corresponds to first setpoint value gs1 or second setpoint value gs2.

Furthermore, and in a conventional manner, gear ascertainment unit 20 checks whether, among the ascertained possible gear ratios gx there is at least one for which the assigned value pair Mdx, nmotx for the engine torque and the engine speed makes possible a half engine operation, that is, that is they lie in the operating variable range of the engine that is shown hatched in FIG. 2. If this is the case, a control output of gear ascertainment unit 20 is set for the activation of controlled switch 35 in the form of a bit B_HMBattainable, otherwise this control output is reset. If this control output of gear ascertainment unit 20 is set, only those gear ratios and respectively assigned value pairs Mdx, nmotx for the engine torque and the engine speed are passed on to first ascertainment unit 10 and second ascertainment unit 15, for which value pairs Mdx, nmotx make possible half engine operation according to the operating variable range hatched in FIG. 1. If the control output of gear ascertainment unit 20 is set, controlled switch 35 is activated to connect the output of first ascertainment unit 10 to debouncing unit 30, otherwise to connect the output of second ascertainment unit 15 to debouncing unit 30.

If gear ascertainment unit 20 ascertains only one single gear ratio, for which assigned value pair Mdx, nmotx enables half engine operation, this gear ratio is output by transmission control unit 5 as first setpoint value gs1 via controlled switch 35 and possibly via debouncing unit 30 as resulting setpoint value gs for the gear ratio, and implemented at the transmission. On the other hand, if a plurality of gear ratios gx is ascertained by gear ascertainment unit 20, for which respectively assigned value pairs Mdx, nmotx enable half engine operation, the first ascertainment unit 10 ascertains first setpoint value gs1 from these gear ratios, according to a further optimization criterion, which is then output via controlled switch 35 and possibly debouncing unit 30 as resulting setpoint value gs by transmission control unit 5, and is implemented at the transmission. This further optimization criterion may involve, for example, a criterion for the operation of the drive unit having a minimum fuel usage. In this case, first ascertainment unit 10 selects from among the gear ratios gx, received by gear ascertainment unit 20, that one as first setpoint value gs1 whose assigned value pair Mdx, nmotx for the engine torque and the engine speed represents the smallest engine speed and the largest engine torque. In this way the least possible fuel consumption may be implemented.

Alternatively, as an additional optimization criterion, an operation of the drive unit having maximum efficiency may be selected in first ascertainment unit 10, and in this case first ascertainment unit 10 selects from gear ratios gx received by gear ascertainment unit 20 that one whose assigned value pair Mdx, nmotx enables the greatest efficiency of the drive unit. For this purpose, in first ascertainment unit 10, for the various gear ratios received by gear ascertainment unit 20 and their respectively assigned value pairs Mdx, nmotx, the assigned efficiencies of the drive unit have to be ascertained in a conventional manner, and from that one may then select the gear ratio having the greatest efficiency as first setpoint value gs1.

In the case where several gear ratios gx are communicated to first ascertainment unit 10 by gear ascertainment unit 20, for which respectively assigned value pair Mdx, nmotx enables the half engine operation, and one of these gear ratios is currently set, then according to a further optimization criterion it may also be provided that one should select the current gear ratio as first specified gear ratio gs1 so as to avoid a switching process and to maintain it.

If the control output of gear ascertainment unit 20 is reset, then all of possible gear ratios gx ascertained by gear ascertainment unit 20 and their respectively assigned value pair Mdx, nmotx are supplied to first ascertainment unit 10 and second ascertainment unit 15, controlled switch 35 being connected to the possibly present debouncing unit 30 for connecting the output of second ascertainment unit 15, and thus resulting setpoint value gs for the gear ratio corresponds to second setpoint value gs2 ascertained by second ascertainment unit 15. The ascertainment of second setpoint value gs2 for the gear ratio by second ascertainment unit 15 thus takes place independently of the operating state of the engine with respect to the number of the active cylinders. In this context, the ascertainment the second specified setpoint value gs2 from gear ratios gx received by gear ascertainment unit 20 may take place according to various optimization criteria, for instance, again according to the optimization criterion of the operation of the drive unit using a minimum of fuel, or the operation of the drive unit having maximum efficiency. The ascertainment of second specified gear ratio gs2 as a function of gear ratios gx received by gear ascertainment unit 20 by second ascertainment unit 15 according to the optimization criterion of minimum fuel usage or maximum efficiency of the drive unit takes place, in this instance, in the manner described before for first ascertainment unit 10.

For the second case of the transmission of setpoint value Mset for the wheel torque to gear ascertainment unit 20, gear ascertainment unit 20 in turn, in a manner known to one skilled in the art, ascertains various, but preferably not necessarily all possible gear ratios gx having a respectively assigned value pair Mdx, nmotx for the engine torque and the engine speed, for which desired wheel torque Mset may also be implemented by the drive unit. The evaluation of the current value of engine torque Md and the current value of engine speed nmot is not necessary in this case. The further sequence and the further method of functioning for ascertaining resulting setpoint value gs for the gear ratio from gear ratios, ascertained by gear ascertainment unit 20, then corresponds to the procedure described in case 1.

Because of the selected optimization criterion of first ascertainment unit 10 and second ascertainment unit 15, there comes about, with regard to this optimization criterion, an operation of the drive unit having an optimum value for the engine torque and the engine speed, and also for the operating state of the engine with regard to the number of the active cylinders, by setting appropriate first specified gear ratio gs1 and correspondingly specified second gear ratio gs2.

It is ensured by the example method according to the present invention and the device according to the present invention that the engine is operated as long as possible in half engine operation. From the point of view of an overall efficiency of engine and transmission, that is, the efficiency of the drive unit, or even with respect to fuel usage, this does not always have to be favorable. In some operating points of the drive unit with regard to engine speed and engine torque, operation of the drive unit outside half engine operation having a higher gear or greater gear ratio may be more favorable with respect to the efficiency of the drive unit or even the fuel usage. Thus, according to an alternative specific embodiment according to FIG. 4, it may be provided that, instead of first ascertainment unit 10 and second ascertainment unit 15, a third ascertainment unit 45 is provided which ascertains a third specified gear ratio gs3, as a function of the optimization criterion of an operation of the drive unit having minimum fuel usage, or as a function of an optimization criterion of the operation of the drive unit having a maximum efficiency. In this case, gear ascertainment unit 20 passes on all ascertained gear ratios gx along with respectively assigned value pairs Mdx, nmotx to this third ascertainment unit 45. Checking in gear ascertainment unit 20 as to which of ascertained gear ratios gx have an assigned value pair Mdx, nmotx that enables half engine operation no longer takes place. Instead, gear ascertainment unit 20 passes on range limits nmot1, nmot2, Md1 for half engine operation also to third ascertainment unit 45. They are alternatively transmitted directly by engine control unit 1 via data bus 40 to third ascertainment unit 45. Third ascertainment unit 45, according to the optimization criterion of maximum efficiency of the drive unit, or according to the optimization criterion of minimum fuel usage, now ascertains from gear ratios gx ascertained by gear ascertainment unit 20, and their respectively assigned value pair Mdx, nmotx, that particular gear ratio as third specified gear ratio gs3 for whose assigned engine torque and assigned engine speed, as well as the operating state of the engine linked therewith, according to FIG. 1, with regard to the number of the active cylinders, the greatest efficiency of the drive unit and the minimum fuel usage is set, depending on the optimization criterion selected. In this context, third ascertainment unit 45, with the aid of received range limits nmot1, nmot2, Md1, is able to ascertain for each of gear ratios gx received by gear ascertainment unit 20 and the assigned value pair Mdx, nmotx, whether this will result in half engine operation or full engine operation. Third specified gear ratio gs3 is then transmitted as setpoint value or gear ratio, that is to be set, to the transmission and is set there. Switch 35 and debouncing unit 30 are no longer required for the exemplary embodiment according to FIG. 4. The efficiency calculation itself and the calculation of the fuel usage as a function of the engine torque, engine speed and the number of the active cylinders is able to take place in a conventional manner.

Figure 4:
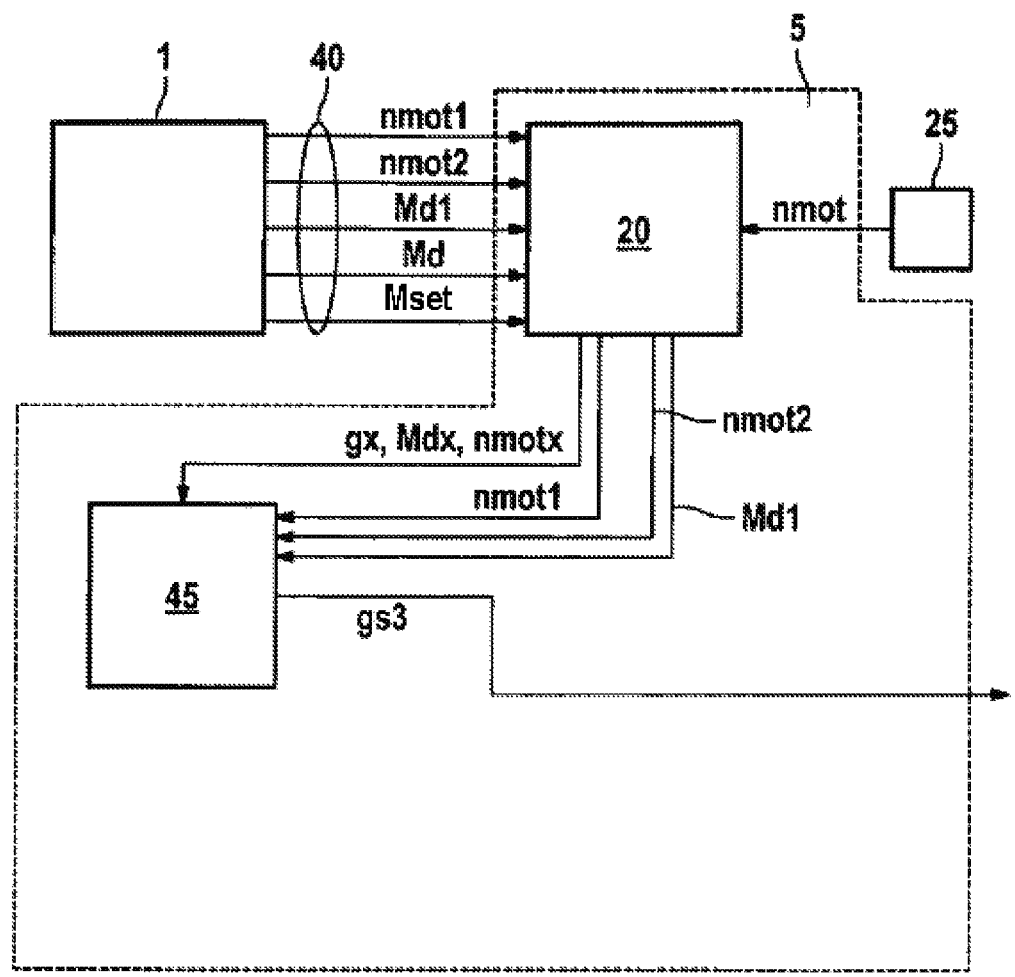
FIG. 4 shows a block diagram for an alternative specific embodiment of the present invention.

The ascertainment of the possible gear ratio from current engine torque Md and current engine speed nmot or from setpoint Mset for the wheel torque takes place in the alternative specific embodiment according to FIG. 4 in a corresponding manner to that of the specific example embodiment described before in FIG. 2.

Figure 3:
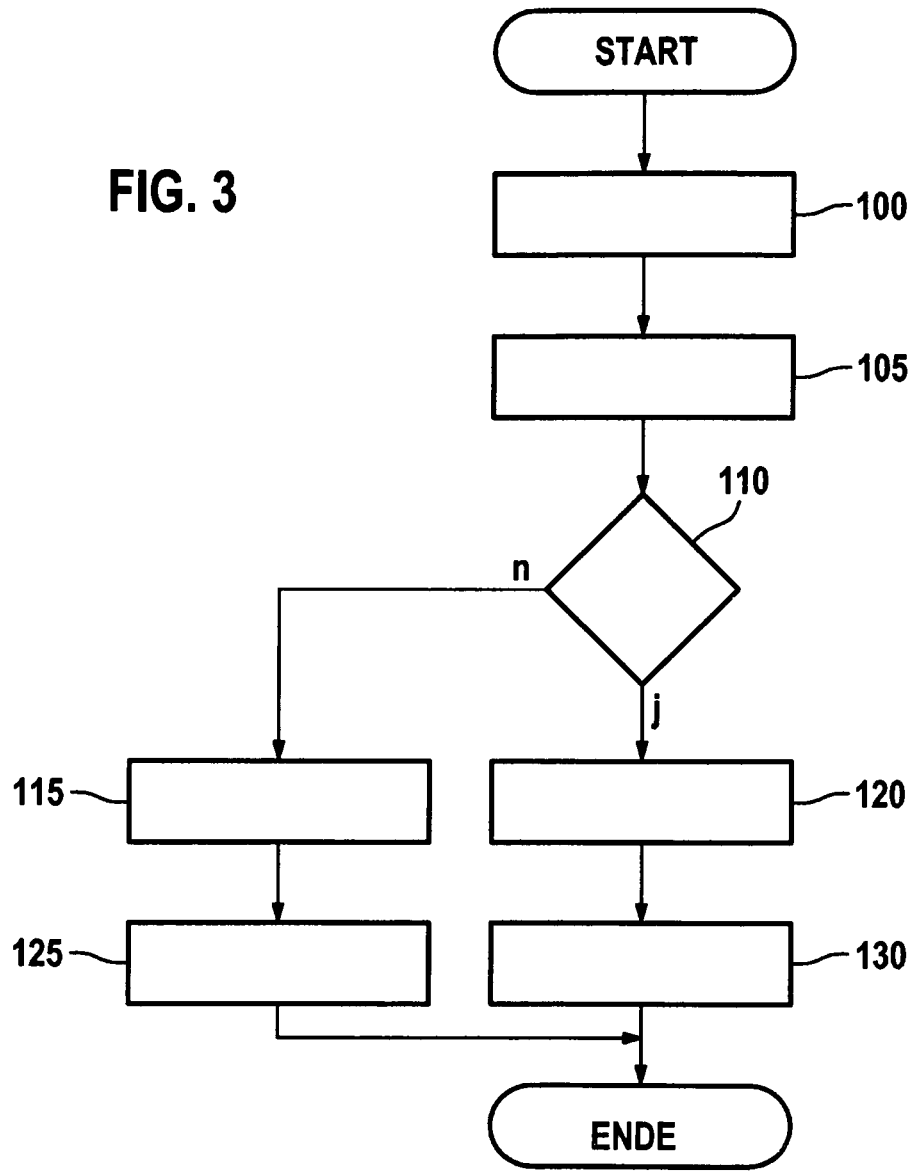
FIG. 3 shows a flow chart for an exemplary sequence of the example method according to the present invention.

FIG. 3 now describes a flow chart for an exemplary sequence of the example method according to the present invention, starting from the specific embodiment according to FIG. 2. After the start of the program, at a program point 100, range limits nmot1, nmot2, Md1 are read in by gear ascertainment unit 20 for half engine operation. In addition, the current value for engine torque Md and the current value for engine speed nmot are read in by gear ascertainment unit 20. Alternatively, gear ascertainment unit 20 reads in setpoint value Mset for the wheel torque. Subsequently, branching to a program point 105 takes place.

At program point 105, gear ascertainment unit 20, in the manner described, ascertains all possible gear ratios, having a respectively assigned value pair for the engine torque and the engine speed, for which that wheel torque sets in which also sets in for the current value for engine torque Md and the current value for engine speed nmot. In the case of the receipt of the setpoint value Mset for the wheel torque in gear ascertainment unit 20, gear ascertainment unit 20 ascertains all gear ratios having a respectively assigned value pair for the engine torque and the engine speed at which setpoint value Mset is able to be set for the wheel torque. In the following, we shall have a look at the gear ratios ascertained by gear ascertainment unit 20 having a respectively assigned value pair for the engine torque and the engine speed, independently of their ascertainment in gear ascertainment unit 20. After program point 105, the program branches to a program point 110.

At program point 110, gear ascertainment unit 20 checks whether among the ascertained gear ratios there are those whose assigned value pair Mdx, nmotx for the engine torque and the engine speed enable half engine operation. If this is the case, branching to a program point 120 takes place; otherwise, branching to a program point 115 occurs.

At program point 120, gear ascertainment unit 20 sets the bit B_HMB_attainable, that is, its control output and transmits to first ascertainment unit 10 and second ascertainment unit 15 only those gear ratios having a respectively assigned value pair Mdx, nmotx for engine torque and the engine speed for which half engine operation is possible. Subsequently, branching to a program point 130 takes place.

At program point 130, first ascertainment unit 10, in the manner described, ascertains first specified gear ratio gs1 from the received gear ratios gx having a respectively assigned value pair Mdx, nmotx. This is output to the transmission by transmission control unit 5 by switch 35 that is appropriately set by the set control output of gear ascertainment unit 20 and possibly present debouncing unit 30 as the resulting setpoint value gs for the gear ratio. Then, the program is exited.

At program point 115, the control output, that is, the bit B_HMB_attainable is reset, and with that switch 35 is activated to connect the output of second ascertainment unit 15 to debouncing unit 30, and gear ascertainment unit 20 passes on all ascertained gear ratios gx having a respectively assigned value pair Mdx, nmotx to first ascertainment unit 10 and to second ascertainment unit 15, independently of whether these gear ratios, having a respectively assigned value pair Mdx, nmotx, enable half engine operation or not.

Subsequently, branching to a program point 125 takes place.

At program point 125, in the manner described, second ascertainment unit 15 selects second specified gear ratio gs2 from gear ratios gx received by gear ascertainment unit 20, and passes these, via controlled switch 35 and optionally provided debouncing unit 30, as the resulting setpoint value gs for the gear ratio, on to the transmission for implementation. Then the program is exited.

If gear ascertainment unit 20 ascertains gear ratios gx from the current value for engine torque Md and the current value for engine speed nmot, gear ascertainment unit 20 ascertains in any case the current gear ratio that is linked to the current value for engine torque Md and the current value for engine speed nmot, and with that, also the current operating state of the engine with respect to the number of the active cylinders. In addition, gear ascertainment unit 20 may also ascertain in this case at least one gear ratio attainable in the future for achieving the same wheel torque which, based on the assigned value pair for the engine torque and the engine speed, is linked to an operating state of the engine with respect to the number of the active cylinders, that will be attainable in the future. It may also happen in this context that a gear ratio ascertained by gear ascertainment unit 20, that will be attainable in the future, is linked to an operating state of the engine with respect to the number of the active cylinders, that has already currently set in.

In the case of the gear ratio ascertainment, starting from setpoint value Mset for the wheel torque, by gear ascertainment unit 20, at least one gear ratio is ascertained by gear ascertainment unit 20 that has already been set, or that will be attainable in the future. The operating state of the engine with respect to the number of the active cylinders that is linked to this at least one gear ratio via the assigned value pair of the engine torque and the engine speed, may be currently set or attainable in the future, in this context.

With the aid of the example according to FIG. 2, it was described that one should, if possible, select gear ratios having an assigned value pair Mdx, nmotx to form the resulting setpoint value gs for the gear ratio, provided it is ascertained by gear ascertainment unit 20, which enables half engine operation. Alternatively, the ascertainment of resulting setpoint value gs for the gear ratio may appropriately also be carried out in such a way that full engine operation is set if possible. In this case, gear ascertainment unit 20 checks whether there is at least one gear ratio among the ascertained ones whose assigned value pair Mdx, nmotx enables a full engine operation, in this case the control output of gear ascertainment unit 20 being able to be set, and only those gear ratios having a respectively assigned value pair Mdx, nmotx being passed on by gear ascertainment unit 20, to first ascertainment unit 10 and to second ascertainment unit 15, in response to which a full engine operation is able to be set.

Instead of the variable engine torque, other variables could alternatively also be used, such as engine output.

With the implementation of setpoint value gs for the gear ratio at the transmission, the engine torque and the engine speed are then also set according to value pair of the engine assigned to setpoint value gs for the gear ratio, in a conventional manner, as well as the operating state of the engine, assigned to this value pair, with respect to the number of the active cylinders, also in a conventional manner.

What is claimed is:

1. A method for operating a drive unit having an engine and a transmission, the method comprising:
   operating, by an engine control unit, the engine in a first operating state using a first number of active cylinders;
   operating, by an engine control unit, the engine in a second operating state using a second number of active cylinders, the first number being different from the second number;
   setting, by a setting unit, a gear ratio as a function of at least one operating variable of the drive unit and as a function of a current or an attainable operating state of the engine with respect to a number of the active cylinders, the gear ratio being set according to an optimization criterion, so that, at a same value for an output variable of the drive unit with respect to the optimization criterion, optimum values come about for the at least one operating variable of the drive unit and the current or the attainable operating state of the engine with respect to the number of the active cylinders; and
   checking, by a checking unit, whether the gear ratio is able to be set at which, at a same value for the output variable of the drive unit, the at least one operating variable assumes a value at which the engine is operated in the first operating state;
   wherein in response to a positive checking result the gear ratio is set, the gear ratio being set independently of the current or the attainable operating state of the engine with respect to the number of the active cylinders in response to a negative checking result.

2. The method as recited in claim 1, further comprising:
   selecting, as the optimization criterion, one of an operation of the engine in the first operating state, an operation of the engine in the second operating state, an operation of the drive unit having minimum fuel usage, or an operation of the drive unit having maximum efficiency.

3. The method as recited in claim 2, wherein:
   the current or the attainable operating state of the engine is set as a function of the at least one operating variable;
   the operation of the engine in the first operating state is selected as the optimization criterion.

4. The method as recited in claim 3, wherein given a plurality of possible gear ratios for the first operating state of the engine, the gear ratio that is to be set is selected from the possible gear ratios according to a further optimization criterion.

5. The method as recited in claim 1, wherein operating limits between the two operating states of the engine are stored as fixed values in a transmission control unit.

6. A device for operating a drive unit having an engine and a transmission, operation of the engine taking place using a first number of active cylinders in a first operating state and using a second number of active cylinders in a second operating state, the first number being different from the second number, the device comprising:
- a setting unit configured to set a gear ratio as a function of at least one operating variable of the drive unit, the setting unit further adapted to set the gear ratio as a function of a current or attainable operating state of the engine with respect to the number of the active cylinders according to an optimization criterion, so that, at a same value for an output variable of the drive unit with respect to the optimization criterion, optimum values come about for the at least one operating variable of the drive unit and the current or the attainable operating state of the engine with respect to the number of the active cylinders; and
- a checking unit to determine whether the gear ratio is able to be set at which, at a same value for the output variable of the drive unit, the at least one operating variable assumes a value at which the engine is operated in the first operating state;
- wherein in response to a positive checking result the gear ratio is set, the gear ratio being set independently of the current or the attainable operating state of the engine with respect to the number of the active cylinders in response to a negative checking result.

7. The device as recited in claim 6, further comprising:
a selection unit to select the optimization criterion, one of an operation of the engine in the first operating state, an operation of the engine in the second operating state, an operation of the drive unit having minimum fuel usage, or an operation of the drive unit having maximum efficiency.

8. The device as recited in claim 7, wherein:
the current or the attainable operating state of the engine is set as a function of the at least one operating variable;
the operation of the engine in the first operating state is selected as the optimization criterion.

9. The device as recited in claim 8, wherein given a plurality of possible gear ratios for the first operating state of the engine, the gear ratio that is to be set is selected from the possible gear ratios according to a further optimization criterion.

10. The device as recited in claim 6, wherein the gear ratio is set as a function of two operating variables.

11. The device as recited in claim 10, wherein the two operating variables are engine speed and engine torque.

12. The device as recited in 6, wherein at least one of operating limits between the two operating states of the engine, and a current value of the at least one operating variable of the drive unit, are transmitted by an engine control unit to a transmission control unit, and the transmission control unit sets the gear ratio.

13. The device as recited in 6, wherein operating limits between the two operating states of the engine are determined as a function of additional operating variables.

14. The device as recited in 13, wherein the additional operating variables are oil pressure and environmental pressure.

15. The device as recited in 6, wherein operating limits between the two operating states of the engine are stored as fixed values in a transmission control unit.

16. A device for operating a drive unit, the device comprising:
- a transmission;
- an engine, operation of the engine taking place using a first number of active cylinders in a first operating state and using a second number of active cylinders in a second operating state, the first number being different from the second number;
- a setting unit configured to set a gear ratio as a function of at least one operating variable of the drive unit, the setting unit further adapted to set the gear ratio as a function of a current or attainable operating state of the engine with respect to the number of the active cylinders according to an optimization criterion, so that, at a same value for an output variable of the drive unit with respect to the optimization criterion, optimum values come about for the at least one operating variable of the drive unit and the current or the attainable operating state of the engine with respect to the number of the active cylinders; and
- a checking unit to determine whether the gear ratio is able to be set at which, at a same value for the output variable of the drive unit, the at least one operating variable assumes a value at which the engine is operated in the first operating state;
- wherein in response to a positive checking result the gear ratio is set, the gear ratio being set independently of the current or the attainable operating state of the engine with respect to the number of the active cylinders in response to a negative checking result.

17. The device as recited in claim 16, further comprising:
a selection unit to select the optimization criterion, one of an operation of the engine in the first operating state, an operation of the engine in the second operating state, an operation of the drive unit having minimum fuel usage, or an operation of the drive unit having maximum efficiency.

18. The device as recited in claim 17, wherein:
the current or the attainable operating state of the engine is set as a function of the at least one operating variable;
the operation of the engine in the first operating state is selected as the optimization criterion.

19. The device as recited in claim 18, wherein given a plurality of possible gear ratios for the first operating state of the engine, the gear ratio that is to be set is selected from the possible gear ratios according to a further optimization criterion.

20. The device as recited in claim 16, wherein the gear ratio is set as a function of two operating variables.

21. The device as recited in claim 20, wherein the two operating variables are engine speed and engine torque.

22. The device as recited in 16, wherein at least one of operating limits between the two operating states of the engine, and a current value of the at least one operating variable of the drive unit, are transmitted by an engine control unit to a transmission control unit, and the transmission control unit sets the gear ratio.

23. The device as recited in 16, wherein operating limits between the two operating states of the engine are determined as a function of additional operating variables.

24. The device as recited in 23, wherein the additional operating variables are oil pressure and environmental pressure.

25. The device as recited in 16, wherein operating limits between the two operating states of the engine are stored as fixed values in a transmission control unit.

* * * * *

UNITED STATES PATENT AND TRADEMARK OFFICE
CERTIFICATE OF CORRECTION

PATENT NO. : 8,423,251 B2  
APPLICATION NO. : 11/991708  
DATED : April 16, 2013  
INVENTOR(S) : Hartmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1427 days.

Signed and Sealed this
Eighth Day of September, 2015

Michelle K. Lee
*Director of the United States Patent and Trademark Office*